United States Patent [19]

Schröder et al.

[11] 3,859,295

[45] Jan. 7, 1975

[54] CERTAIN 2,3,5-TRIHALO-6-METHYL-PYRID-4-YL-ALKANOATES

[76] Inventors: Ludwig Schröder, Frankbenstr. 7, Ingelheim, Rhein; Klaus Thomas, Pfarrer-Rudolf-Str. 4, Gau-Algesheim, both of Germany

[22] Filed: Jan. 26, 1972

[21] Appl. No.: 221,070

[30] Foreign Application Priority Data

Jan. 27, 1971 Germany............................ 2103728
Dec. 15, 1971 Germany............................ 2162238

[52] U.S. Cl........ 260/295 R, 260/294.9, 260/296 R, 260/297 R, 260/294.8 G, 260/270 R, 424/263, 424/266, 71/94

[51] Int. Cl............................................. C07d 31/36
[58] Field of Search ..................... 260/295 R, 297 R

[56] References Cited

UNITED STATES PATENTS

| 3,249,419 | 5/1966 | Martin.............................. 260/297 r |
| 3,256,290 | 6/1966 | Johnston......................... 260/297 R |
| 3,644,388 | 2/1972 | Tomlin et al.................... 260/297 R |

*Primary Examiner*—Alan L. Rotman
*Attorney, Agent, or Firm*—Hammond & Littell

[57] ABSTRACT

The compounds are derivatives of 2-methyl-6-chloropyridine and are useful as biocidal agents.

5 Claims, No Drawings

CERTAIN 2,3,5-TRIHALO-6-METHYL-PYRID-4-YL-ALKANOATES

This invention relates to novel derivates of 2-methyl-6-chloropyridine as well as to the use of these compounds as active ingredients of biocidal compositions and to methods of preparing the new compounds.

More particularly, the present invention relates to a novel class of compounds of the formula

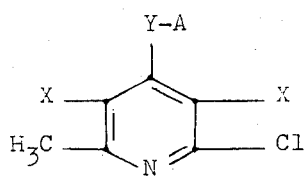

wherein
A is a hydrogen atom, an equivalent of an inorganic or organic cation or one of the radicals R, COR, COOR, CH₂COR or CH₂COOR, whereby R is a hydrogen atom, an alkyl or alkenyl group optionally substituted by chlorine, hydroxy, cyano, dimethylamino or phenyl group, with up to 17 carbon atoms or a cycloalkyl group with 3 to 6 carbon atoms, a phenyl, pyridyl, tetrahydrofurfuryl group or a phenyl group substituted by chlorine or nitrogen, and
X is chlorine, bromine or iodine,
Y is oxygen or sulfur, as well as the salts thereof.

The compounds of formula I possess biocidal activity.

The novel compounds may be prepared according to the following reactions:

1. In order to produce the compounds of formula

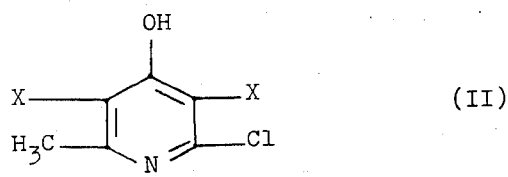

the compounds of formula

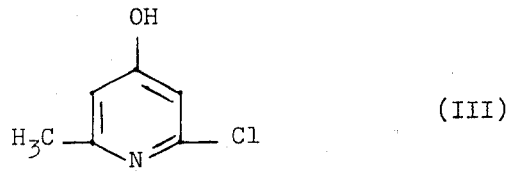

are halogenated in 3- and 5-position according to conventional methods.

2. In order to produce compounds of formula

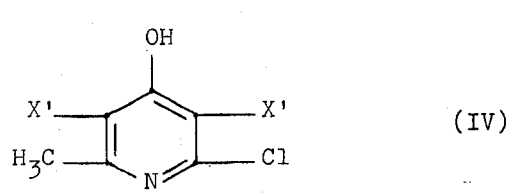

wherein X' represents chlorine or bromine, there is exchanged within a compound of formula

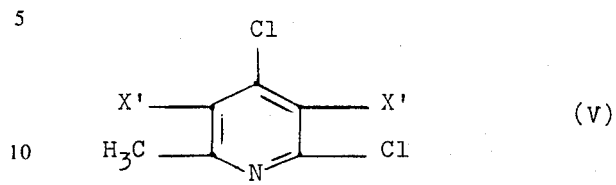

wherein X' means chlorine or bromine, the 4-chlorine atom for the hydroxy group, preferably by heating with alkaliacetate, water and dimethylformamide.

3. In order to produce compounds of formula I, wherein Y—A represents the SH-group, are reacted
   a. compounds of formula II with phosphorus pentasulfide or
   b. compounds of formula V with an alkalihydrogensulfide in dimethylformamide.

4. The compounds obtained in line with 1. to 3. of formula

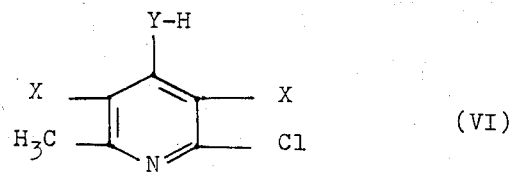

are reacted, if desired, according to conventional processes, with suitable reaction partners to such compounds of formula I, wherein A has another meaning than hydrogen.

Therefor are suited, above all, reactions of the compounds of formula VI or the salts thereof with compounds Z—R, Z—COR, Z—COOR, Z—CH₂—COR, wherein Z means a group easily removable as anion, f.i. a chlorine or bromine atoms.

For chlorination or bromination according to 1. elementary chlorine or bromine may be used, for iodination iodine chloride or iodic acid/iodine are used.

The introduction of iodine when using iodine chloride is effected preferably in water at elevated temperature, f.i. at boiling temperature. When reacting with iodine/iodic acid, it is preferably worked within water/ethanol; however, other organic solvents miscible with water may be used too instead of ethanol, as far as they are sufficiently inert under the reaction conditions.

Saponification according to (2.) may be effected as well with mineral acids, f.i. concentrated hydrochloric acid, or with aqueous/alcoholic alkali lyes. However, with this process the yields are smaller than with the system water/potassium acetate/dimethylformamide, or the 2-chlorine atom in compound V is, partly, replaced by the hydroxy group.

The replacement of chlorine by the sulfhydryl group succeeds in compound V easily and in good yield by means of the action of sodium hydrogensulfide in dimethylformamide at approx. 20° to 50°C.

The starting materials for production of the compounds according to the invention may be obtained according to the following reaction scheme:

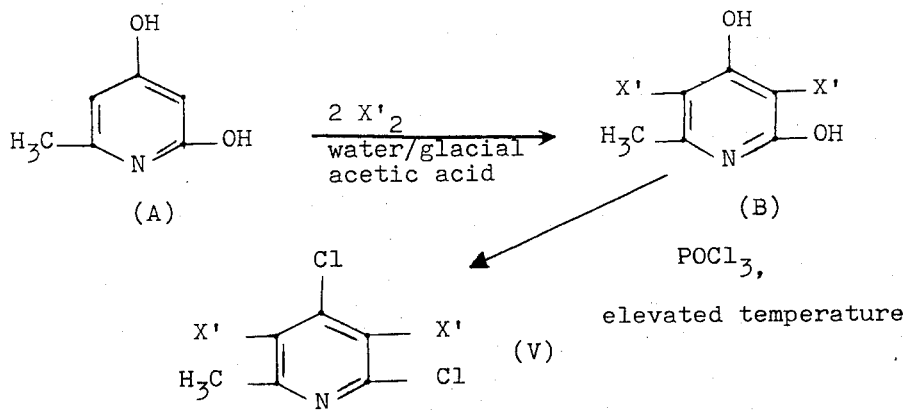

The starting materials of formula III may be obtained according to the following reaction scheme:

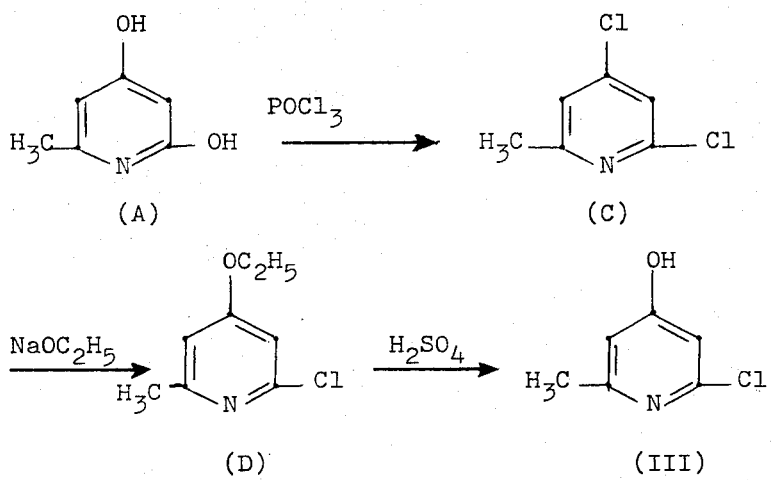

The compounds according to the invention are biocidally active; they are characterized especially by herbicidal and fungicidal activity. The compounds of formula I wherein Y is an oxygen atom, in particular, act selectively herbicidal upon broad-leaf weeds by means of leaf treatment post emergence. They may be applied in quantities of approx. 0.3 to 5, preferably 0.75 to 2.5 kg per hectar, e.g. in cereals.

In particular, the esters of such compounds of formula I, wherein Y means a sulfur atom, show beside the herbicidal also a fungicidal activity, f.i. on powdery mildew (erysiphe graminis) in rye.

Furthermore, an action on animal pests and a parasiticidal, f.i. coccidiostatic, action must be mentioned. The new compounds of this invention can be applied as pesticides in any manner recognized by the art. They may, for example, be presented in the form of suspensions, wettable powders, dusting powders, emulsions, solutions or sprays.

The prefered concentration of active ingredient for use in pesticidal compositions according to the invention is from 0.001 to 5% by weight, more especially from 0.01 to 0.5% by weight. Dusting powders and ultra low volume (ULV) formulations may however contain considerably more of the active ingredient, for example up to about 85% by weight.

For the production of pesticides at least one active ingredient as defined by formula I is formulated using known carriers and additives (e.g. solvents, diluents, stabilizers, dispersion agents, wetting agents, emulgators). Moreover, the new pesticides may be combined with known biocidal compounds.

FORMULATION EXAMPLES a. Suspension Powder
   25% by weight of a compound according to the invention
   55% by weight of kaolin
   10% by weight of colloidal silicic acid
   9% by weight of calcium-lignine-sulfonate (dispersion agent)
   1% by weight of sodium salt of tetrapropylenebenzenesulfonic acid (wetting agent)
or
   85% by weight of a compound according to the invention
   6% by weight of calcium-lignine-sulfonate
   3% by weight of colloidal silicic acid
   4% by weight of sodium sulfate
   2% by weight of diisobutylnaphthaline-sodium-sulfonate The ingredients are intimately admixed with each other, and the mixture was milled into a fine powder, which was then suspended in a sufficient amount of water to make the active ingredient content of the aqueous suspension from 0.001 to 5% by weight.

b. Emulsion Concentrate
   40% by weight of a compound according to the invention
   25% by weight of Shellsol A (mixture of liquid aromatic hydrocarbons)
   25% by weight of N-methylpyrrolidone
   10% by weight of Emulsogen I 40 (anionic emulsifier)

The ingredients according to a. and b. resp. are mixed in the usual manner. For use the resulting concentrates are diluted with water so that the concentration of the active ingredients is from about 0.001 to 5% by weight.

c. Dusting Powder

5% by weight of a compound according to the invention

5% by weight of colloidal silicic acid

90% by weight of talcum

The mixture of active ingredient and silicic acid is mixed with talcum and, subsequently, finely ground.

EXAMPLE 1 a. 2-Methyl-4,6-dihydroxy-pyridine

A solution of 1292 g β-aminocrotonic acid ethyl ester, 1602 g diethyl malonate and 530 g sodium methylate in 2000 ml methanol is heated in an autoclave to 150°C for 5 hours. After cooling the precipitate is sucked off and added to 4 kg of 50 percent aqueous potassium hydroxide. This mixture is heated on a steambath until the temperature reaches about 90°C. The clear brown solution is then acidified with conc. hydrochloric acid to pH 4. The precipitate is sucked off, washed with water and dried at 120° to 150°C.

Yield 900 g, m.p. >300°C.

b. 2-Methyl-3,5-dibromo-4,6-dihydroxypyridine

To a stirred suspension of 625 g of 2-Methyl-4,6-dihydroxypyridine in 2500 ml water 1600 g of bromine are added at 20° to 30°C during 1 hour. The mixture is stirred for further 10 minutes. Then 30 percent aqueous sodium sulfite solution is dropped in to give a white product, which is sucked off, washed with water and dried at 120°C.

Yield 1400 g, m.p. 218°–220°C.

c. 2-Methyl-3,5-dichloro-4,6-dihydroxypyridine 462,5 g of 2-Methyl-4,6-dihydroxypyridine are suspended in 1200 ml of acetic acid. While stirring and cooling with ice 525 g chlorine are introduced during 5 hours. The reaction mixture is then poured into 5 l of water. Then sodium sulfite is added until the dichloro compound precipitates. The precipitate is sucked off, washed with water and dried at 120°C.

Yield 233 g, m.p. 238°–240°C.

d. 2-Methyl-3,5-dibromo-4,6-dichloro-pyridine 283 g of 2-Methyl-3,5-dibromo-4,6-dihydroxypyridine are heated with 1000 ml of phosphorus oxychloride in an autoclave. The excess of phosphorus oxychloride is subsequently distilled off in vacuo and the residue is put into water. The resulting crystalline product is sucked off and dried.

Yield 300 g, m.p. 119°C (from methanol).

e. 2-Methyl-3,4,5,6-tetrachloropyridine

The compound is formed by reacting 194 g of 2-Methyl-3,5-dichloro-4,6-dihydroxypyridine with 1000 ml of phosphorus oxychloride during 5 hours at 100°C. Isolation of the product see d.

Yield 235 g, m.p. 88°–90°C (from isopropanol).

f. 2-Methyl-3,5-dibromo-4-hydroxy-6-chloropyridine (ASD 1072)

A mixture of 400 g of 2-Methyl-3,5-dibromo-4,6-dichloro-pyridine, 800 g of potassium acetate and 800 ml of dimethylformamide is heated to 140°C while stirring. Then about 120 ml of water are added dropwise until a clear solution has formed. The solution is heated to 140°C for another 3 hours, then poured into 3 l of 1 N ammonium hydroxide, filtered and acidified with hydrochloric acid. The precipitate is sucked off, washed with water and dried.

Yield 261 g, m.p. > 300°C (decomp.)

In an analogous manner 2-Methyl-3,5,6-trichloro-4-hydroxy-pyridine (ASD 1333) is prepared from 2-methyl-3,4,5,6-tetrachloropyridine. M.p. 300°–305°C.

EXAMPLE 2

Sodium salt of 2-Methyl-3,5-dibromo-4-hydroxy-6-chloropyridine 301 g of the compound according example 1 f. are added to a methanolic solution of 23 g of sodium. The mixture is evaporated to dryness. M.p. of the sodium salt > 300°C (decomp.).

EXAMPLE 3

2-Methyl-3,5-dibromo-4-benzoyloxy-6-chloropyridine (ASD 1164)

322 g of the salt according to example 2 are suspended in toluene (or dioxane, acetone, dibutylether) and a solution of 140 g benzoylchloride in 500 ml of the same solvent is added dropwise. The mixture is refluxed for 5 hours, the solvent is distilled off and the residue is washed with 1 N sodium hydroxide and water and recrystallized from isopropanol.

Yield 78% of theory, m.p. 142°–144°C.

EXAMPLE 4

2-Methyl-3,5-dibromo-4-benzyloxy-6-chloropyridine (ASD 1395)

322 g of the salt according to example 2 are suspended in 1000 ml dimethyl-formamide, 126,5 of benzylchloride are added and the mixture is heated to 100°C for 3 hours. It is the poured into 2 l of water, the mixture is made alkaline and the precipitate is sucked off and recrystallized from ethanol.

Yield 80% of theory. 5

EXAMPLE 5

2-Methyl-3,5,6-trichlor-4-sulfhydrylpyridine (ASD 1404)

231 g of the compound according to example 1 e. are dissolved in 500 ml of dimethyl-formamide and 84 g of sodium hydrogensulfide portion by portion. After stirring at 40° to 50°C for 3 hours the mixture is poured into 2 l of water and acidified with hydrochloric acid. The precipitate is sucked off and dried.

Yield 200 g, m.p. 102°–104°C (from isopropanol).

EXAMPLE 6

2-Methyl-3,5-dibromo-4-acetoxy-6-chloro-pyridine (ASD 1166)

301 g of the compound according to example 1 f. and 100 ml of acetic acid anhydride are bioled for about 20 minutes. After cooling, the excess of the acetic acid anhydride is destroyed with water, the precipitate is sucked off, washed with water and dried.

Yield 300 g, m.p. 86°–88°C (from isopropanol).

EXAMPLE 7

2-Methyl-3,5-dibromo-6-chloro-4-pyridyl-tetrahydrofurfurylcarbonic acid ester (ASD 1411)

A mixture of 8 g of the sodium salt according to example 2, 4.9 g of chloroformic acid tetrahydrofurfuryl ester and 80 ml dried dioxane is refluxed for 20 hours. The reaction mixture is then poured into 200 ml of water. The solution is extracted twice with 150 ml of ether, the organic phase is dried, and after removing the solvent the residue is distilled.

Yield 52% of theory, b.p.$_{0.05\ Torr}$ 155°–157°C.

EXAMPLE 8

2-Methyl-3,5-dibromo-4-ethoxycarbonylmethoxy-6-chloropyridine (ASD 1336)

A mixture of 15 g of the sodium salt according to example 2, 5.7 g of chloroacetic acid ethyl ester and 80 ml dimethylformamide are reacted at 140°C for 2 hours. After cooling the mixture is poured into 250 ml of water and the precipitate is sucked off.

Yield 15 g, m.p. 98°–99°C (from isopropanol).

The compounds of the following tables I to III are prepared in a manner analogous to that as described in examples 1 to 8.

TABLE I

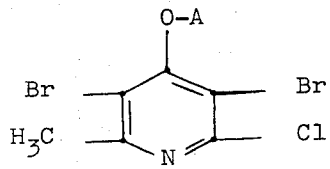

| Compound | ASD-No. | A | melting point [°C] |
|---|---|---|---|
| a |  | $\overset{\oplus}{H_3N}-CH_2-CH_2-OH$ | 200 (decomp.) |
| b | 1163 | $CH_3$ | 96 – 97 |
| c | 1182 | $CH_2-CH_2-OH$ | 220 (decomp.) |
| d | 1396 | $CH_2-CH=CH_2$ | 127-128 |
| e | 1464 | 2,4-dinitrophenyl ($NO_2$, $NO_2$) | 246 |
| f | 1445 | $CO-CH_2-CH_2-Cl$ | 84-86 |
| g | 1335 | $CO-CH_2-CH_2-CH_3$ | 74-75 |
| h | 1463 | $CO-(CH_2)_3-Cl$ | 92-93 |
| i | 1454 | $CO-(CH_2)_4-CH_3$ | 35-36 |
| k | 1455 | $CO-(CH_2)_7-CH_3$ | 27-28 |
| l | 1401 | $CO-(CH_2)_{16}-CH_3$ | 56-57 |
| m | 1442 | $CO-CH(C_2H_5)-(CH_2)_3-CH_3$ | oil |
| n | 1451 | $CO-CH=CH-CH_3$ | 120-122 |
| o | 1446 | $CO-(CH_2)_7-CH=CH-(CH_2)_7-CH_3$ | oil |
| p | 1453 | $CO-CH=CH-C_6H_5$ | 151-153 |
| q | 1447 | $CO-CH\underset{CH_2}{\overset{CH_2}{\diagdown\!\!\diagup}}$ (cyclopropyl) | 74-76 |
| r | 1461 | $CO-C_6H_5$ | 57-58 |
| s | 1165 | $CO-C_6H_4-Cl$ | 186-191 |
| t | 1334 | $CO-C_6H_3Cl_2$ | 141-142 |
| u | 1337 | $CO-OCH_3$ | 77-79 |
| v | 1410 | $CO-O-CH_2-CH=CH_2$ | b.p. $_{0,05}$ 115-120 |
| w | 1414 | $CH_2-CO-OC_{12}H_{25}$ | 47-48 |
| x | 1415 | $CH_2-CO-OCH_2-CH=CH_2$ | 87-88 |

Table I (continued)
| Compound | ASD-No. | A | melting point [°C] |
|---|---|---|---|
| y | 1416 | $CH_2-CO-OCH_2-C_6H_5$ | 105-106 |
| z | 1456 | $CH_2-CO-C_6H_5$ | 135-137 |
| aa | 1457 | 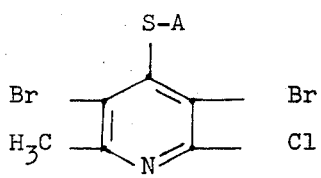 | 173-174 |
TABLE II
Compounds of the formula
| Compound | ASD-No. | A | melting point [°C] |
|---|---|---|---|
| a | 1330 | H | 126-128 |
| b | 1330NA | $Na^{\oplus}$ | 250 |
| c | 1422 | $(CH_2)_{11}-CH_3$ | b.p.$_{0,05}$ 200-205 |
| d | 1421 | $CH_2CN$ | 105-108 |
| e | 1420 | $CH_2-CH_2-N(CH_3)_2$ | 53-54 |
| f | 1331 | $CO-CH_3$ | 68-70 |
| g | 1423 | $CO-(CH_2)_2-CH_3$ | 84-85 |
| h | 1443 | $CO-C(CH_3)_3$ | 104-106 |
| i | 1418 | $CO-(CH_2)_{16}-CH_3$ | 40-45 |
| k | 1441 | $CO-CH(C_2H_5)-(CH_2)_3-CH_3$ | oil |
| l | 1444 | $CO-CH_2-CH_2-Cl$ | 96-97 |
| m | 1424 | $CO-(CH_2)_7-CH=CH-(CH_2)_7-CH_3$ | oil |
| n | 1425 | $CO-CH\!<\!\substack{CH_2\\CH_2}$ | 86-90 |
| o | 1426 | $CO-C_6H_{11}$ | 93-96 |
| p | 1439 | $CH_2-CO-CH_3$ | 94-96 |
| q | 1417 | $CH_2-CO-OC_2H_5$ | 68-70 |

TABLE III

Compounds of the formula

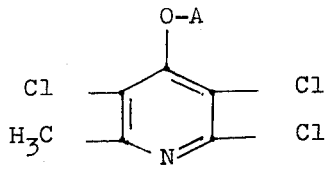

| Compound | ASD-No. | A | melting point [°C] |
|---|---|---|---|
| a | 1332 | $CO-CH_3$ | 77-79 |
| b | 1458 | $CO-(CH_2)_8-CH_3$ | 40-41 |
| c | 1429 | $CO-CH_2-CH_2-Cl$ | 70-72 |
| d | 1450 | $CO-CH\underset{CH_2}{\overset{CH_2}{<}}$ | 69-70 |
| e | 1429 | $CO-OC_6H_5$ | 87-88 |
| f | 1428 | $CH_2-CO-OCH_2-C_6H_5$ | 75-77 |

EXAMPLE 9

(2-Chloro-3,5-diodo-6-methyl-pyrid-4-yl)-hexanoate a. 2,4-Dichloro-6-methyl-pyridine 127 g of 2,4-dihydroxy-6-methyl-pyridine and 250 ml of phosphorus oxychloride are heated in an autoclave to 130°C for 3 hours. After cooling the product is poured on 2 kg of ice and neutralized with conc. aqueous ammonia. The separating oil is extracted with ether. The ethereal phase is dried, the solvent removed and the residue distilled in vacuo.
Yield 90% of theory, b.p.$_{12}$Torr 84°C.

b. 2-Chloro-4-ethoxy-6-methyl-pyridine 486 g of 2,4-dichloro-6-methyl-pyridine are dissolved in 450 ml of dimethyl-formamide and heated to 60°C. A solution of 204 g of sodium ethylate in 250 ml of dimethyl-formamide is added dropwise at 60°C. After the reaction has finished 2 l of water are added and the mixture is extracted twice with 500 ml of benzene. The organic phase is dried, evaporated and fractionally distilled in vacuo. The main fraction (about 340 to 360 g of 2-chloro-4-ethoxy-6-methyl-pyridine) distills at 127°-130°C/12 Torr.

c. 2-Chloro-4-hydroxy-6-methyl-pyridine 172 g of 2-chloro-4-ethoxy-6-methyl-pyridine are heated with a mixture of 200 ml of conc. sulfuric acid and 40 ml of water to 180°C for 25 minutes. The resulting solution of the title compound may be used for the next step.

d1. 2-Chloro-3,5-diodo-4-hydroxy-6-methyl-pyridine

The solution of example 9 c. is poured into 2 l of ethanol and the mixture is filtered. While stirring 202 g of iodine are added and then a solution of 70.4 g of iodic acid in 400 ml of water is dropped in during 10 minutes. The solution is then refluxed for about 1 hour. The reaction product precipitates. After suction-filtration the product is washed with ethanol.
Yield 85% of theory, m.p. 265°-268°C.

d2. The solution of example 9 c. is diluted with 4 l of water and a mixture of 324 g of iodinechloride and 650 ml of 10 percent hydrochloric acid is added. By heating the reaction mixture slowly to the boiling point, the iodinated compound is precipitated. It is isolated, washed with water and methanol and dried.
Yield 75% of theory, m.p. 260°-265°C.

e. (2-Chloro-3,5-diiodo-6-methyl-pyrid-4-yl)-hexanoate (ASD 1592)

39.6 g of 2-chloro-3,5-diiodo-4-hydroxy-6-methyl-pyridine are added to a solution of 2.3 g of sodium in 100 ml of methanol and the mixture is evaporated. The residual adhesive methanol is removed by azeotropic destillation after adding 200 ml of toluene. The sodium salt is isolated and dried, then suspended in 100 ml of methyl-isobutylketone. 13.5 g hexanoic acid chloride are added dropwise, the mixture is refluxed for 5 hours and cooled. After adding 200 ml of toluene the suspension is extracted twice with 100 ml of 0.5 percent aqueous sodium hydroxide. The organic phase is dried, evaporated and the remaining oil is crystallized from isopropanol.
Yield 90% of theory, m.p. 69°-70°C.

The compounds of the following table are prepared analogous to example 9.

TABLE IV

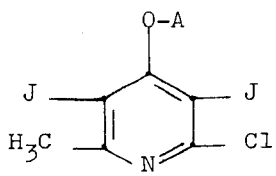

| Compound | ASD-No. | A | melting point [°C] |
|---|---|---|---|
| a | 1541 | H | > 240 (decomp.) |
| b | 1540 | $CH_3CO$ | 105 |
| c | 1545 | $C_3H_7CO$ | 70 |
| d | 1593 | $C_7H_{15}CO$ | oil |
| e | 1594 | $C_9H_{19}CO$ | oil |
| f | 1595 | $C_2H_5CO$ | 96-98 |
| g | 1596 | $(CH_3)_2NCO$ | 125-127 |
| h | | $CH_3CO_2$ | 105-106 |
| i | | $C_3H_7OCO$ | 95-96 |
| k | | 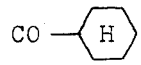—OCO | 98-100 |
| l | | $(CH_3)_2CHOCO$ | 112-115 |
| m | | $CH_2=CH-CH_2-OCO$ | 68-72 |
| n | | $C_{12}H_{25}OCO$ | oil |
| o | | $CH_3OCH_2CH_2OCO$ | 105-106 |
| p | | 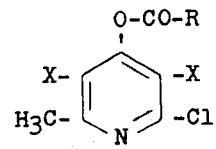 | oil |

Further compounds according to the invention; formula

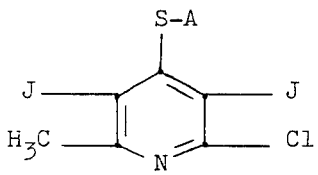

A has the following meaning:
H
Na⊕
½ Cu²⊕
CH₃
(CH₂)₁₁—CH₃
CH₂CN
CH₂—CH₂—N (CH₃)₂
CO—CH₃
CO—CH₂—CH₂—CH₃
CO—(CH₂)₁₆—CH₃
CO—CH₂—CH₂—Cl
CH₂—CO—CH₃
CH₂—COOC₂H₅
CO—OC₆H₅

CO—CH⟨CH₂ | CH₂⟩

CO—⟨H⟩
CO—(CH₂)₇—CH=CH—(CH₂)₇—CH₃

We claim:
1. A compound of the formula

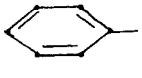

wherein
R is alkyl of 1 to 8 carbon atoms, and
X is bromine or iodine.
2. The compound of claim 1 which is 2-chloro-3,5-dibromo-6-methyl-pyrid-4-yl hexanoate.
3. The compound of claim 1 which is 2-chloro-3,5-diiodo-6-methyl-pyrid-4-yl hexanoate.
4. The compound of claim 1 which is 2-chloro-3,5-diiodo-6-methyl-pyrid-4-yl acetate.
5. The compound of claim 1 which is 2-chloro-3,5-diiodo-6-methyl-pyrid-4-yl propionate.

* * * * *

UNITED STATES PATENT OFFICE
CERTIFICATE OF CORRECTION

Patent No. 3,859,295                     Dated January 7, 1975

Inventor(s) LUDWIG SCHRÖDER and KLAUS THOMAS

It is certified that error appears in the above-identified patent and that said Letters Patent are hereby corrected as shown below:

In the Title Page insert

[73] Assignee: Boehringer Ingelheim G.m.b.H.
                Ingelheim/Rhein, Germany Signed and sealed this 8th day of April 1975.

(SEAL)
Attest:

RUTH C. MASON
Attesting Officer

C. MARSHALL DANN
Commissioner of Patents
and Trademarks